US008443359B2

(12) United States Patent
Bernoth

(10) Patent No.: US 8,443,359 B2
(45) Date of Patent: May 14, 2013

(54) METHOD AND SYSTEM FOR PROVIDING A FILTER FOR A ROUTER

(75) Inventor: Andrew J. Bernoth, Lara (AU)

(73) Assignee: International Business Machines Corporation, Armonk, NY (US)

( * ) Notice: Subject to any disclaimer, the term of this patent is extended or adjusted under 35 U.S.C. 154(b) by 1539 days.

(21) Appl. No.: 11/935,848

(22) Filed: Nov. 6, 2007

(65) Prior Publication Data
US 2009/0119661 A1 May 7, 2009

(51) Int. Cl.
*G06F 9/445* (2006.01)
*G06F 9/44* (2006.01)
*G06F 15/16* (2006.01)
*G06F 15/173* (2006.01)

(52) U.S. Cl.
USPC ........... 717/174; 717/120; 717/176; 709/229; 709/242

(58) Field of Classification Search ........................ None
See application file for complete search history.

(56) References Cited

U.S. PATENT DOCUMENTS

| | | | | |
|---|---|---|---|---|
| 5,828,830 | A | 10/1998 | Rangarian et al. | 714/48 |
| 5,903,269 | A | 5/1999 | Poreh et al. | 715/804 |
| 5,903,545 | A | 5/1999 | Sabourin et al. | 370/225 |
| 6,157,940 | A | 12/2000 | Marullo et al. | 703/27 |
| 6,167,567 | A | 12/2000 | Chiles et al. | 717/173 |
| 6,212,511 | B1 * | 4/2001 | Fisher et al. | 1/1 |
| 6,493,871 | B1 | 12/2002 | McGuire et al. | 717/173 |
| 6,643,669 | B1 | 11/2003 | Novak et al. | 707/201 |
| 6,751,674 | B1 | 6/2004 | Satagopan et al. | 709/249 |
| 6,898,618 | B1 | 5/2005 | Slaughter et al. | 709/203 |
| 6,959,320 | B2 | 10/2005 | Shah et al. | 709/203 |
| 7,392,522 | B2 * | 6/2008 | Murray et al. | 717/174 |
| 7,681,193 | B2 * | 3/2010 | Oprea et al. | 717/174 |
| 7,769,873 | B1 * | 8/2010 | Mackie | 709/229 |
| 7,810,089 | B2 * | 10/2010 | Sundarrajan et al. | 717/174 |
| 8,078,758 | B1 * | 12/2011 | Callon | 709/242 |
| 2002/0080798 | A1 | 6/2002 | Hartguchi et al. | 370/339.31 |
| 2003/0014665 | A1 * | 1/2003 | Anderson et al. | 713/201 |
| 2003/0195957 | A1 * | 10/2003 | Banginwar | 709/223 |
| 2004/0085962 | A1 | 5/2004 | Sugai et al. | 370/392 |
| 2004/0105441 | A1 | 6/2004 | Bourgart et al. | 370/392 |
| 2004/0148520 | A1 * | 7/2004 | Talpade et al. | 713/201 |
| 2006/0037000 | A1 * | 2/2006 | Speeter et al. | 717/120 |
| 2007/0044095 | A1 * | 2/2007 | Banerjee | 717/176 |

OTHER PUBLICATIONS

Huici et al., An edge-to-edge filtering architecture against DoS, Mar. 2007, 11 pages, <http://delivery.acm.org/10.1145/1240000/1232924/p39-huici.pdf>.*
Hooper et al., An Intelligent Intrusion Detection and Response System Using Network Quarantine Channels: Adaptive Policies and Alert Filters, Dec. 2006, 4 pages, <http://delivery.acm.org/10.1145/1200000/1194672/27490045.pdf>.*
Kompella et al., On scalable attack detection in the network, Feb. 2007, 12 pages, <http://delivery.acm.org/10.1145/1250000/1241834/p14-kompella.pdf>.*
Shalunov et al., Quality of service and denial of service, Aug. 2003, 4 pages, <http://delivery.acm.org/10.1145/950000/944600/p137-shalunov.pdf>.*

* cited by examiner

*Primary Examiner* — Thuy Dao
(74) *Attorney, Agent, or Firm* — Steven E. Bach

(57) ABSTRACT

A method and system for providing a standardized set of filters for a router. A set of pre-written filters are provided in a file, and a program is run on a computer to identify one of these pre-written filters as a substitute for a filter that was specifically written for the router. The standardized filter file is then loaded onto the router and the identified substitute filters are used instead of the filter that has been specifically written for the router. Preferably, the computer program is used to identify which one of the pre-written filters of the pre-written filter files most closely matches, according to a predefined test, the filter file written specifically for the router.

2 Claims, 4 Drawing Sheets

METHOD AND SYSTEM FOR PROVIDING A FILTER FOR A ROUTER

FIELD OF THE INVENTION

This invention generally relates to routers, and more specifically, to procedures for providing routers with filters.

BACKGROUND OF THE INVENTION

Routers are used to direct data among and between subnetworks or devices of a network. Because a network can include tens of thousands of individually addressable devices, the operation of a router can be quite complex.

In order to perform their complex operations, routers may be provided with filters, which are sets of rules that determine how the routers transmit data. For instance, when a router receives data, a filter may be used to determine the type or class of the data, and based on the type or class of data, the router may forward the packet of data to a queue, permit or prevent the data packet from passing through a firewall, prioritize the data, or perform other functions relating to handling and/or transmission of the data. For example, a filter may be employed to determine when, where and how to send the data. A filter may also be used to specify valid combinations of source and destination IP addresses, source and destination ports and protocol for messages allowed to pass through a firewall.

Occasionally, after a network has been designed and implemented and is in use, a filter may be written specifically for the network in order to address circumstances or situations specific to that network. Although the people writing such specific filters may be very knowledgeable about certain aspects of the operation and needs of the network, these people often have very limited expertise or experience in writing filters. Because of this, these specifically written filters may not be very effective, or may actually have adverse unintended consequences.

SUMMARY OF THE INVENTION

In an exemplary embodiment, The invention provides a method and system for providing a filter file for a router. A set of pre-written standardized filters are provided, and a program is run on a computer to identify one of these pre-written filters as a substitute for a non-standard filter that was written specifically for the router. That identified substitute filter is loaded onto the router and used instead of the filter that had been specifically written for the router. Preferably, the computer program is used to identify which one of the pre-written standardized filters most closely matches, according to a predefined test, the filter written specifically for the router.

According to an exemplary embodiment of the present invention, the predefined test (to determine which pre-written standardized filter most closely matches the non-standard existing filter) comprises matching the protocol of the pre-written standardized filter to the protocol of the existing filter and combinations of source and destination ports of the pre-written standardized filter that include all of the source and destination ports defined in the existing filter.

According to another exemplary embodiment of the present invention, the predefined test (to determine which pre-written standardized filter most closely matches the non-standard existing filter) comprises matching a preferred service as defined by a well known source or destination port in the pre-written standardized filter to a service as defined by a well known source or destination port that is no longer preferred in the existing filter.

According to another exemplary embodiment of the present invention, the predefined test (to determine which pre-written standardized filter most closely matches the non-standard existing filter) is directed to tightening up the filter. That is, the defined test for matching comprises identifying a pre-written standardized filter for which a specific destination port designation in the pre-written standardized filter matches the specific destination port designation in the existing filter and a source port designation in the pre-written standardized filter does not permit a specific source port that has been determined to be problematic through testing and/or the use of various network tools.

According to another exemplary embodiment of the present invention, the predefined test (to determine which pre-written standardized filter most closely matches the non-standard existing filter) is directed to completing a set of filters by excluding ports known to be associated with a potential issue. That is, the defined test for matching comprises identifying a pre-written standardized filter for which a specific set of destination port designations in the pre-written standardized filter matches a sub-set of the specific destination port designations in the existing filter that has been determined to be problematic through testing and/or the use of various network tools. The sub-set of ports that is matched excludes the ports that have been determined to be problematic.

Further benefits and advantages of the invention will become apparent from a consideration of the following detailed description, given with reference to the accompanying drawings, which specify and show preferred embodiments of the invention.

DETAILED DESCRIPTION

Figure 1:
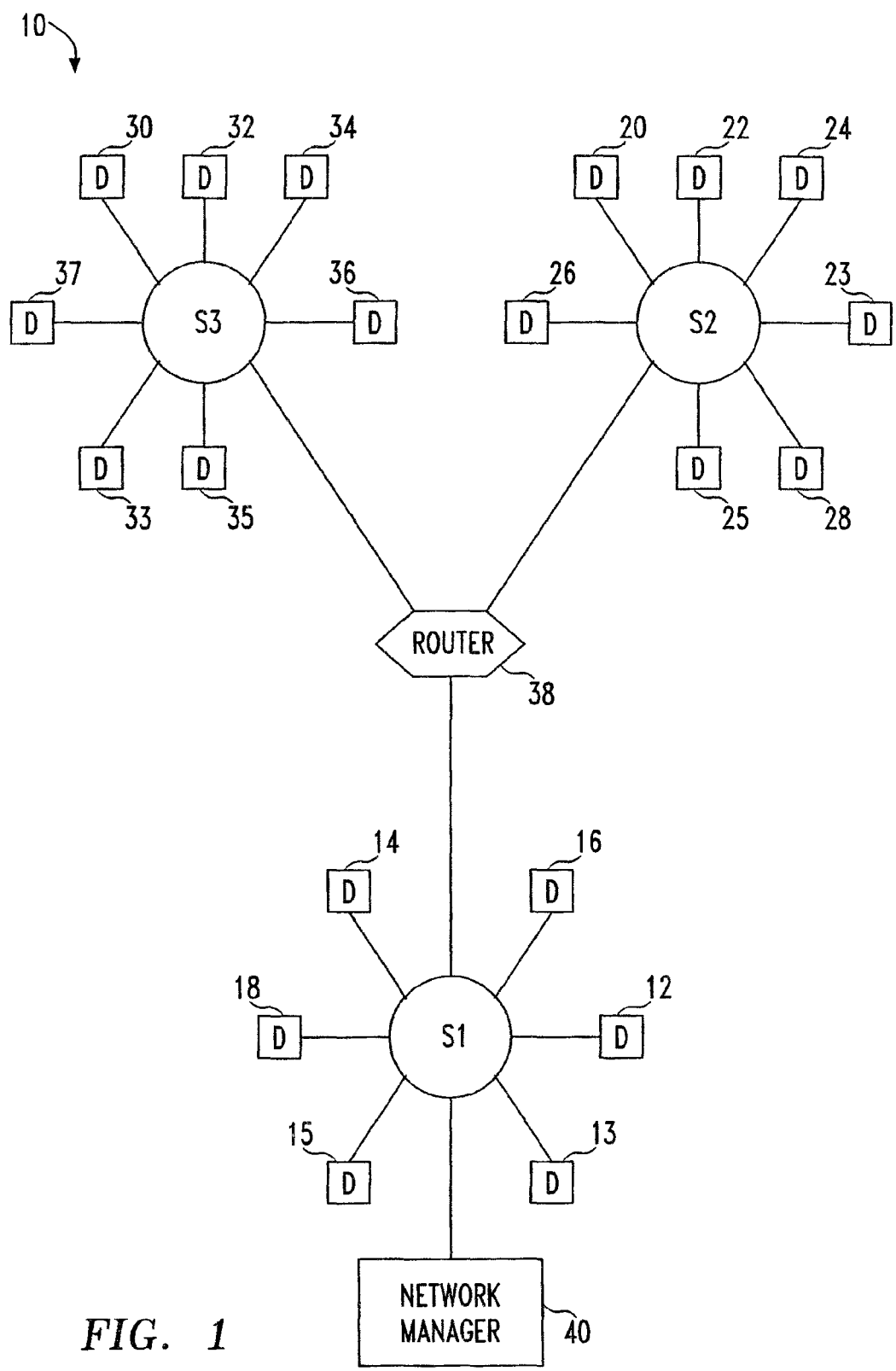
FIG. 1 shows a network having a router and a group of subnetworks.

FIG. 1 shows a network 10 which, for illustrative purposes, includes a first, second and third subnetworks (hereinafter referred to as subnets) S1, S2 and S3. The subnets S1, S2 and S3 can have the same topologies or they can have different topologies. The topologies include, but are not limited to, Token ring, Ethernet, X.25 and FDDI. Devices 12, 13, 14, 15, 16 and 18 are connected to the first subnet S1; devices 20, 22, 23, 24, 25, 26 and 28 are connected to the second subnet S2; and devices 30, 32, 33, 34, 35, 36, and 37 are connected to the third subnet S3. A router 38 interconnects the first, second and third subnets S1, S2 and S3. It should be noted that for the purposes of this document, the terms "router" and "firewall" are used interchangeably.

The devices or hosts 12-37 can be workstations, personal computers, hubs, printers, network adapters, multiplexers, etc. It should be noted that for purposes of this document, the terms "hosts" and "devices" are used interchangeably. The network 10 is scalable, which allows computing resources to be added as needed. Although only a small number of devices 12-38 are shown, the network 10 can encompass many addressable devices, for instance, up to tens of thousands of addressable devices.

Each device 12-38 has a physical address and a unique Internet protocol (IP) address. For example, TCP/IP may be used as the protocols that regulate how data are packeted into IP packets and transported between the devices 12-38. Network 10 may also include a network manager 40 that is connected to the first subnet S1, and any suitable management protocol may be used in the operation of the network.

Router 38 is provided with one or more filters to help secure the network from potentially malicious data transmissions by controlling or preventing either the sending or receiving of unexpected data. Each filter is a set of rules that determine how the router will transmit data. A filter may also specify valid combinations of source and destination IP addresses, source and destination ports, and protocol for messages allowed to pass through the firewall. As mentioned above, filters will often be written after a network is implemented in order to address specific circumstances of the network operation. Often, these specific filters are written by individuals who are not experts at writing filters. As a result, although the intended purposes of the filters may be highly desirable, the filters themselves may not be effective or may have adverse unintended consequences. For example a filter may be written to restrict certain ports or protocols. Consequently, the firewall may block a non-malicious message addressed to or from such a port or having such a protocol.

As another example; a time sensitive service such as audio is provided over a network. An application developer decides to utilize a specific TCP destination port of 4455 for the time sensitive audio service. In this case the router administrator decides to write a specific filter to prioritize this audio service when the router sees a packet with a TCP destination port of 4455. After installing the filter, for this example, an unintended adverse consequence results where the audio service is delivered to the end service such that the audio is not clear, or has unexpected pauses causing jitter in the audio stream. By using other network tools such as a log file or perhaps a protocol analyser, the router administrator may identify other services that are not time sensitive but are also matching the filter (because they have a destination port of 4455) and being given higher priority. For example, an SSH service which is assigned a well known TCP port of 22 may be utilized to provide management functions to the audio server and therefore occasionally responds such that the packet matches TCP Source Port 22 and TCP Destination port equals 4455.

Generally, in accordance with an exemplary embodiment of the present invention, a set of pre-written (standardized or proper) filters are provided, and a program is run on a computer to identify one of these pre-written filters as a substitute for the filter that was written specifically for the router. That identified substitute filter is loaded onto the router, and used instead of the filter that had been specifically written for the router. Preferably, the computer program is used to identify which one of the pre-written filters of the pre-written filter files most closely matches, according to a predefined test, the filter written specifically for the router.

Figure 2:
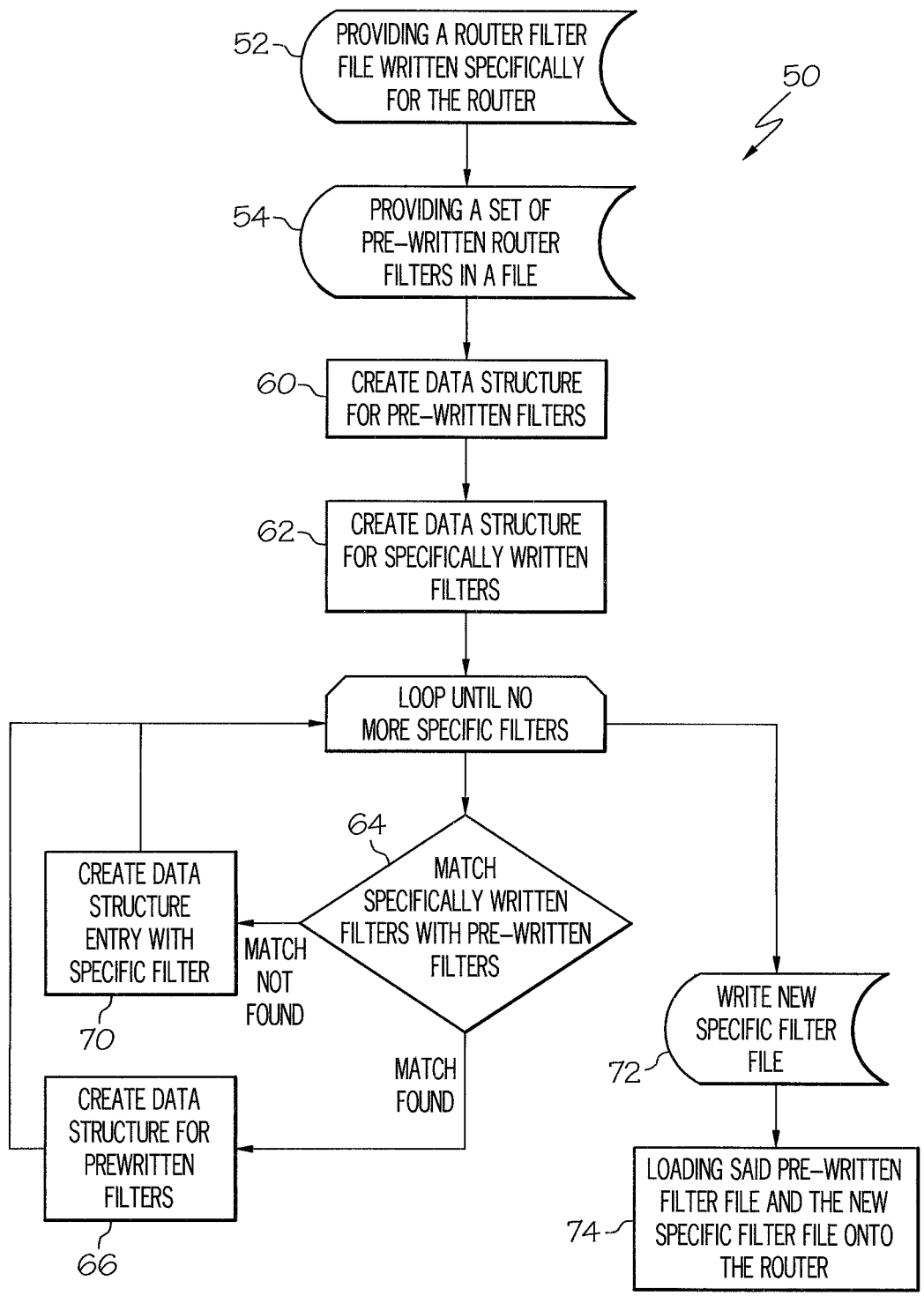
FIG. 2 is a flow chart illustrating a preferred implementation of this invention.

FIG. 2 illustrates a preferred program routine 50 for performing a test to identify one or more substitute filters for the specifically written filters. In step 52, program routine 50 provides a router filter file written specifically for the router. The program routine may sequentially provide each existing specifically written filter for substitution by a pre-written filter. Alternatively, a search for specifically written filters matching a criteria related to a specific problem, such as filters designating destination port 4455 from the foregoing example, may be executed and the specifically written filters meeting that criteria are provided.

In step 54 program routine 50 receives a set of pre-written router filters in a file. Any suitable set of pre-written filters may be used in the practice of this invention. For example, standard commercially available filters may be used, or non-standard filters may be used.

At steps 60 and 62, program routine 50 creates data structures for the pre-written filter and for the specifically written filters, respectively. Within the TCP/IP protocol standard some fields are defined that can be used to identify traffic. According to an exemplary embodiment, an application utilizes these fields to create a data structure to match against. The data structure may define any of these fields specifically in which case the invention would match the field exactly, or the field may be restricted in which case the invention would attempt to match part of the field, or thirdly the field may be undefined in which case the invention would utilise another field to create a match, but may also use the data within the specific filter to further populate the pre-written filter.

In an exemplary generic TCP/IP data structure model, data fields are defines as follows:

| Data Structure Name | Expected Variable Options |
|---|---|
| Identifier: | Filter name |
| Filter Action: | Permit or Deny or Drop (Term defined by the filtering device) |
| TCP/IP Source Address: | 32 bit address |
| TCP/IP Source Mask: | 32 bit mask |
| TCP/IP Destination Address: | 32 bit address |
| TCP/IP Destination Mask: | 32 bit mask |
| TCP Protocol | TCP or UDP or ICMP or Numeric Value |
| Protocol Variable 1 ($1^{st}$ Variable in the diagram) | For TCP or UDP this would be the Source Port<br>For ICMP this would be the ICMP Type<br>For Other Protocols this would be UNDEFINED |
| Protocol Variable 2 ($2^{nd}$ variable in the diagram) | For TCP or UDP this would be the Destination Port<br>For ICMP this would be the ICMP Code<br>For Other protocols this would be UNDEFINED |
| Flags or Options ($3^{rd}$ Variable in the diagram) | Variable length field to capture filter specific options such as:<br>TCP Protocol Specific options: SYN, ACK, FIN (Synchronise, Acknowledge and Finish flags as defined by the TCP protocol)<br>Device Specific options: LOG, |

Filter Action has multiple definitions which are restricted only by the specific filter device. Typical options include: permit, which allows the packet to pass through the firewall in a firewall application, or place the packet in a defined queue in a priority queuing application; deny, which stop the packet from passing through the firewall without notifying the requesting device in a firewall application, or not place the packet in the queue in a priority queue application; and drop, which stops the packet from passing through the firewall and also notify the requesting device that the packet was stopped in a firewall application, not typically used in a priority queuing application.

In the TCP/IP Protocol field, the TCP/IP standard defines a number of protocols by numeric identifiers. The typical ones used in firewall or priority queuing applications would be ICMP (1), TCP (6) and UDP (13) whereas, in an exemplary embodiment of this invention, other protocols such as IPSEC

(50) would simply be stored with the protocol name or numeric ID. In another exemplary embodiment other protocols may also utilize the data structure or define another data structure more suitable to that protocol. Protocol Variable 1, currently takes advantage of the similarity in packet standards between TCP and UDP such that the source port for either of these protocols is stored in this variable. Given ICMP is also a well known and highly used protocol it was determined that the proposed data structure also stores the ICMP type in this field and the system then is protocol aware based on the value stored in the protocol field. Protocol Variable 2, also takes advantage of the similarity in packet standards between TCP and UDP such that the destination port for either of these protocols is stored in this variable. Similarly, the proposed data structure also stores the ICMP code in this field and the system then is protocol aware based on the value stored in the protocol field. Flags or options: The data structure used here leaves this third field defined as free-form text in order to capture any filter specific data such as other flags within the TCP protocol or filtering device specific flags such as log or count. The device specific flag, "log" would instruct the filtering device to log the packet typically to an external log store. Similarly, the device specific flag, "count" would instruct the filtering device to increase a specific count variable within the filtering device. This field allows the system defined in this disclosure to process more than one brand of filtering device.

As represented by step 64 (and described in more detail below), program routine 50 performs a test to match the specifically written filter(s) with the pre-written filters. When program 50 finds a match for a specifically written filter, the program 50 creates a data structure for the matched pre-written filter (step 66). When no match is found for a specifically written filter, the routine creates a data structure entry with the specific filter (step 70). Steps 64, 66 and 70 are repeated until searches have been performed to find matches for all of the specifically written filters. Then, program 50 writes a new specific filter file (step 72), and the pre-written filter file and the new specific filter file are loaded onto the router (step 74).

The specifically written filters are typically written to address specific circumstances of the network operation. For example, specifically written filters may address a preferred protocol, preferred or allowed ports for source and destination computers and TCP functions such as log and acknowledge. Specifically written filters may be used to control what data is allowed to pass through a firewall. Also, as in the audio example above, specifically written filters may be used to prioritize data having specific features, such as a specific destination port.

Program routine 50 identifies a specifically written filter to substitute for the pre-written filter by matching features of the specifically written filter with features of the pre-written filters (step 64) as described in greater detail below. Prior to selecting an appropriate pre-written filter by matching a pre-written filter to the specifically written filter, program routine 50 generates a data structure that identifies key features of the specifically written filter (step 62). Key features of the specifically written filter may include, for example, communication parameters such as permitted or required protocol, permitted or requires source and/or destination IP address, or permitted or requires source and/or destination ports. Program routine 50 also identifies features of the pre-written filters for communication parameters (step 60).

In step 64, program routine 50, compares a subset of the key features of the specifically written filter to the features of the set of pre-written filters using a predefined test to identify which of the pre-written filters match this subset of features. Then, program routine 50 compares another subset of features of the specifically written filter to the features of the pre-written filters to determine which pre-written filters match both the first and second subsets of features is an adequate match to substitute for the specifically written filter.

In an exemplary embodiment, the data structure utilizes three parameters as key features. The first parameter definition is the specific TCP/IP protocol. For filters in an exemplary embodiment, the protocol is a common protocol from within the TCP/IP standard definitions, (i.e., TCP, UDP, ICMP as well as allowing for other protocols). Within both the TCP and UDP protocol definitions the communications protocol contains both a source and destination port each with a value between 1 and 65535. The data structure captures these values or range of values placing the source port in "variable 1" and the destination port in "variable 2".

In the case of ICMP where each ICMP Type has a relating ICMP Code, the ICMP Type is stored in "variable 1" and the ICMP Code in "variable 2".

Additionally, part of the TCP flow control allows a filter to check for the "acknowledge" bit within a packet, this bit indicates a communications session that is already initiated. This and other TCP options defined by a filter may be stored in "variable 3".

Within a filter definition are the ability to log the packet or session can also be defined. In an exemplary embodiment, this filter ability or definition would be stored in "variable 3" as a specifically written filter may still have a need to log certain traffic when the rest of the filter can be replaced with the pre-written filter.

By way of example, a specific filter is written as follows:

$$\text{Permit tcp destination\_port telnet log} \qquad (1)$$

In this filter, the protocol is defined as telnet (a well known protocol which is defined to use port 23). The specific filter does not define a source port.

A pre-written filter is provided as follows:

$$\text{Permit tcp source\_port range 1024 65535} \\ \text{destination\_port telnet} \qquad (2)$$

Figure 2A:
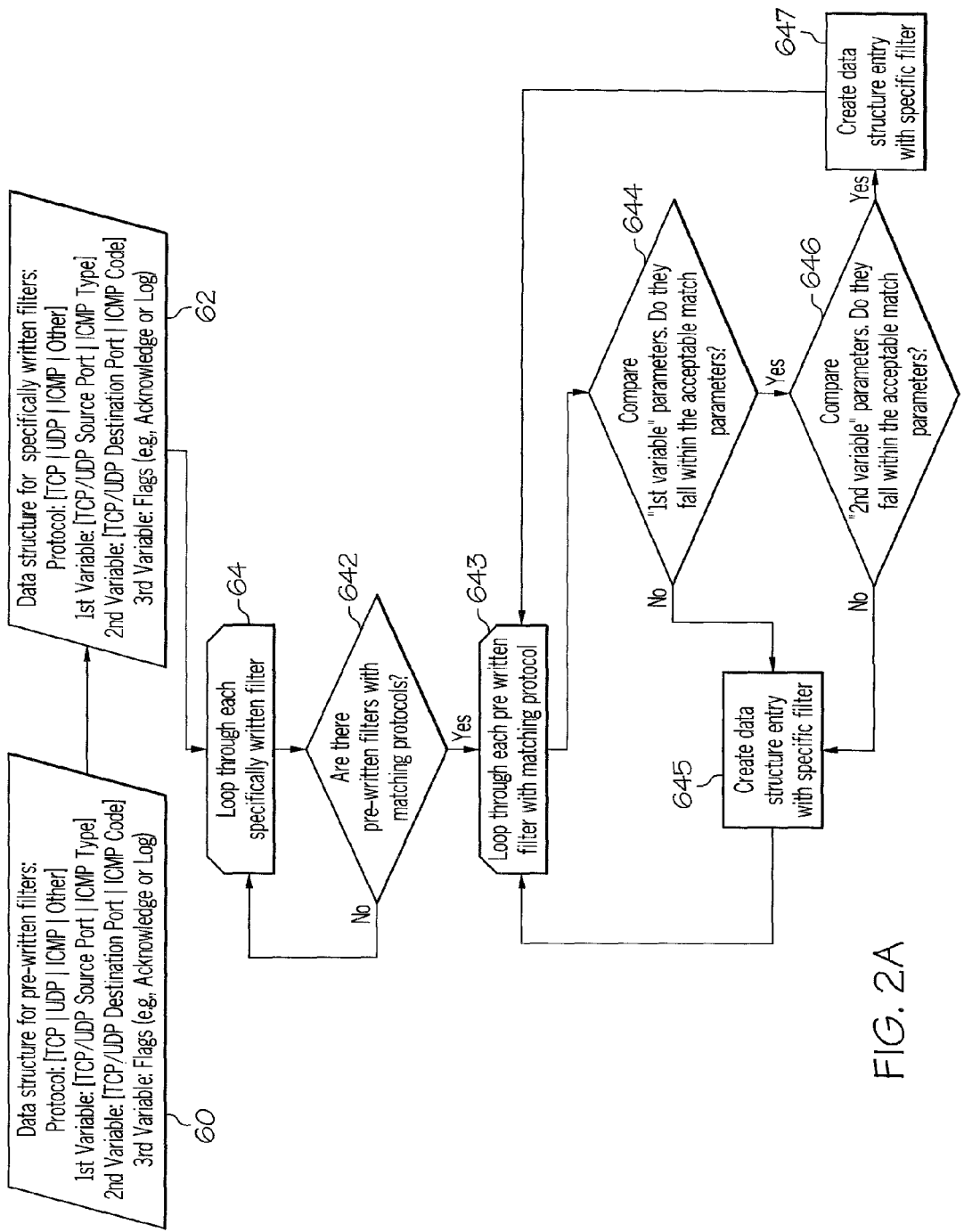
FIG. 2a is a flow chart illustrating more specific details of the process to match a specific filter with a pre-defined filter.

As shown in FIG. 2A, program routine 50 creates a data structure for each pre-written filter (step 60) and for each specifically written filter (step 62). The data structure comprises a protocol, such as a TCP, UDP, CMP, etc; a first variable, which in the case of TCP and UDP protocols is a source port, and in the case of CMP protocol is CMP type; a second variable, which in the case of TCP and UDP protocols is a destination port, and in the case of CMP is CMP code; and a third variable which is for flags such as acknowledgement or log functions.

To select pre-written filters as substitutes for the specifically written filter, the specifically written filters are looped through sequentially (step 641). The pre-written filters are matched to the specifically written filters by protocol (step 642). That is the protocol of each pre-written filter is compared to the protocol of each specifically written filter to identify all pre-written filters with a protocol that matches each specifically written filter. Matching step 642 may continue until all pre-written filters having a matching protocol are identified for each specifically written filter. In an exemplary embodiment, the matching criteria, or predefined test is an exact match for protocol. Thus, if a specifically written filter has a protocol "telnet" as in specifically written filter (1), only pre-written filters with a protocol of "telnet" such as pre-written filter (2) would match. It should be understood that the test for a matching protocol might be defined as an exact match as described above, or a match might be defined such that an exact match of protocol is not required as will be described below.

Next, the application loops through each pre-written filter with the protocol that matches the protocol of the specifically written filter, according to the defined test (step 643), and compares parameters of the first variable of the pre-written filters to the parameters of the first variable for the specifically written filter to determine whether there is an acceptable match (step 644). The defined test may comprise an exact match of the first variable or another matching criteria, such as equivalent ports, at least all of the permitted source ports in the specific filter, or at least one source port in the pre-written filter that is permitted in the specifically written filter, or any other matching criteria which addresses the circumstances of the network for which the specifically written filter was created.

In the above examples (specifically written filter (1) and pre-written filter (2), the specifically written filter does not define a source port, whereas the pre-written filter does define the range of 1024 through 65535 for the source port. (This range is the unassigned ports from within the protocol definition standard.) Thus, the first variable would meet the matching test if equivalent ports were the defined matching test, since permitting all unassigned ports as source ports is equivalent to not defining a permitted source port.

If a pre-written filter is identified that is an acceptable match for the specifically written filter for the first variable, then the application compares the second variable for the pre-written filters to the second variable of the specifically written filter to determine whether or not they match according to a defined test (step 646). For specifically written filter (1), the second variable is destination port definition. Again, the defined test may be an exact match, equivalent destination ports, all destination ports permitted in the specifically written filter also being permitted in the pre-written filter, etc.

In the example of specifically written filter (1) and pre-written filter (2), the specifically written filter (1) defines a well known protocol "telnet" which is defined to utilize port 23. The pre-written filter (2) also defines the protocol "telnet". Since the filters meet the matching criteria, in this case the destination port for Telnet, and the filters have previously been matched for first and second variables, the pre-written filter would be inserted in place of the specifically written filter along with any other flags that are defined in the pre-written filter as well as any specific flag (such as log) that does not violate the security control.

In the present example, the application would create a data structure for the pre-written filter (step 647). This data structure would be created by adding the log flag to the pre-written filter (2), and the resulting specific filter data structure using the pre-written filter (2) would be:

Permit tcp source_port range 1024 65535 destination
        port telnet log                                     (2A)

If no match is found for the first or second variable, then a data structure entry is created with the specific filter (1) (step 645).

In another exemplary embodiment, there are a group of specifically written filters:

Permit tcp destination_port 135                        (3)

Permit tcp destination_port 137                        (4)

Permit tcp destination_port 138                        (5)

Permit tcp destination_port 139                        (6)

These filters define a group of well known ports. It may be that a pre-written filter also permits the use of port 136, and instead of creating a separate filter line for each specifically written filter, the updated filters are grouped together in a single line such that the pre-written filter is:

Permit tcp destination_port range 135 139            (7)

In this case the selection criteria is set to identify that more than one line of a specifically written filter may simply be a subset of a more inclusive filter from the pre-written set which is now preferred. In this case the multiple lines of specific filters (3), (4), (5) and (6) would be replaced by the single instance of the pre-written filter (7).

in a further example a preferred protocol changes from "telnet" to "SSH". Referring back to the first example where the pre-written filter was used and looking forward to a future change in router or firewall policy, beginning with the specific filter as the filter resulting from the first example:

Permit tcp source_port range 1024 65535
        destination_port telnet log                          (2A)

The application performs the process of FIG. 2A to identify a pre-written filter to substitute for the current specifically written filter. One of the available pre-written filters is:

Permit tcp source_port range 1024 65535
        destination_port ssh                                     (8)

In this case, the defined test for a match for the protocol is the newly preferred protocol. That is, for specifically written filters having a protocol definition of "telnet", the preferred protocol "SSH" is a match and not the former protocol "telnet". Accordingly, the system identifies that while telnet was formerly accepted, in this case a preference to move to the SSH protocol enables a match for the filter with a pre-written filter defining "SSH" (step 642) and, following matching of the first variable (step 644) and the second variable (step 646), the new filter is created as previously described (step 647). Thus, the new filter is:

Permit tcp source_port range 1024 65535 destination
        port ssh log                                              (9)

Returning now to the example of the audio filter prioritizing data with a destination port designation of 4455. If, in this case, the router administrator could confirm with the application developer that the audio service is expected to utilize a random port other than TCP port 22, then the router administrator defines a new filter such that the TCP source port must match the random range 1024 through 65535 and the destination port must match the expected port of 4455 before the packet is placed in the high priority queue. If testing shows this indeed fixes the problem, then the router administrator reconfigures the rule and the invention disclosed within this document could then be used to identify any other routers with the original incomplete filter and replace it with the correct filter. That is, a pre-written filter having a source port in the random range 1024 through 65535 would be substituted for specifically written filters having a destination port restricted to 4455 and no source port restriction, thereby ensuring the time sensitive audio service receives priority whereas the management function in this example no longer interferes with the high priority queue.

Likewise, any suitable criteria and procedures may be employed to identify the appropriate substitute filter for the specifically written filter. These criteria and procedures may be identified in advance, or may be determined at the time the program is run to identify the substitute filter. Also, the criteria and procedures may be provided by the individuals or entities that provide the pre-written filters, or by the individuals or entity who wrote the specifically written filter.

Figure 3:
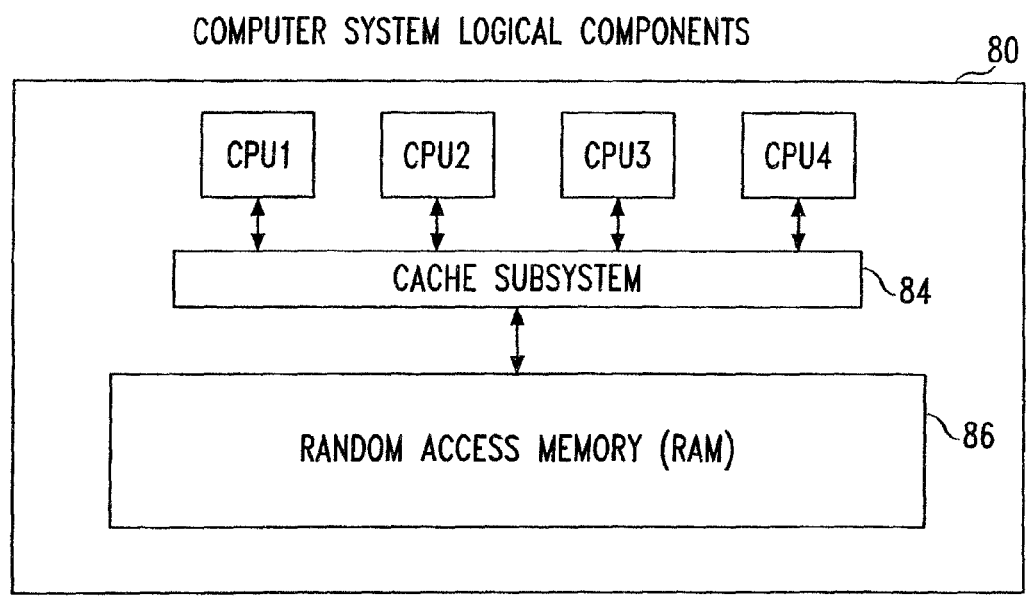
FIG. 3 shows a computer system that may be used in the practice of the invention.
Figure 4:
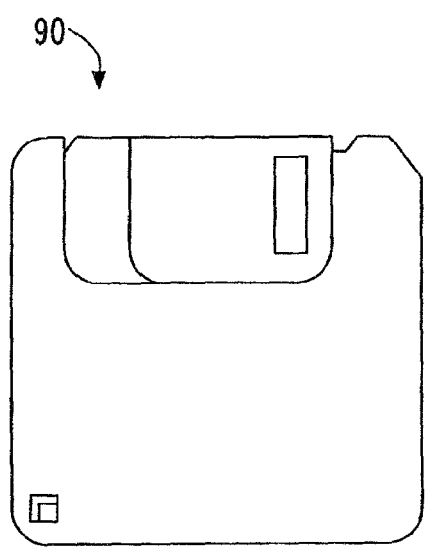
FIG. 4 illustrates a memory medium that can be used to hold a computer program for carrying out this invention.

As will be understood by those skilled in the art, any suitable computing or calculating system or apparatus may be used to practice this invention. For example, a suitable computer system illustrated at 80 in FIG. 3 may be used. System 80, generally, comprises a series of CPUs, a cache subsystem 84, and a random access memory (RAM) 86. Also, as will be understood by those skilled in the art, the present invention may be embodied in a computer program storage device (including software embodied in a magnetic, electrical, optical or other storage device). One suitable storage medium is illustrated, for example, at 90 in FIG. 4.

While it is apparent that the invention herein disclosed is well calculated to fulfil the objects stated above, it will be appreciated that numerous modifications and embodiments may be devised by those skilled in the art, and it is intended that the appended claims cover all such modifications and embodiments as fall within the true spirit and scope of the present invention.

Another such embodiment could concentrate solely on TCP/IP addresses whereby consolidation of IP addresses could be achieved. Similarly, yet another embodiment may also capture and include IP addresses within the filters described above.

The invention claimed is:

1. A method for selecting a pre-written filter for a router in a network, the method comprising the steps of:
   a computer identifying an existing filter installed in the router that permits messages with a specified protocol sent from a first range of or alt source ports to a specified destination port that supports the protocol;
   the computer searching a plurality of available pre-written filters for a substitute fitter that permits messages with the specified protocol sent from fewer source ports than permitted by the existing filter to the destination port that supports the protocol to substitute for the existing filter in the router, wherein the existing filter includes a log or an acknowledgement function, the substitute filter does not include the log or acknowledgement function, and the computer modifies the substitute filter to include the log or acknowledgement function such that the modified substitute filter is installed in the router; and
   the computer writing the modified substitute fitter into a file for installation in the router to substitute for the existing filter.

2. A computer program product for selecting a pre-written filter for a router in a network, the computer program product comprising:
   a computer readable storage device;
   program instructions to identity an existing filter installed in the router that permits messages with a specified protocol sent from a first range of or all source ports to a specified destination port that supports the protocol;
   program instructions to search a plurality of available pre-written filters for a substitute filter that permits messages with the specified protocol sent from fewer source ports than permitted by the existing filter to the destination port that supports the protocol to substitute the existing filter in the router; and
   program instructions to write the substitute filter into a file for installation in the router to substitute for the existing filter; and wherein
   the existing filter includes a log or an acknowledgement function, the substitute filter does not include the log or acknowledgement function, and program instructions to modify the substitute filter to include the log or acknowledgement function such that the modified substitute filter is installed in the router; and
   the program instructions are recorded on the computer readable storage device.

* * * * *